(12) United States Patent
Tsai

(10) Patent No.: US 7,823,854 B2
(45) Date of Patent: Nov. 2, 2010

(54) DISPLAY WITH A LINEAR DRIVING DEVICE

(75) Inventor: Cheng-Han Tsai, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 1054 days.

(21) Appl. No.: 11/549,643

(22) Filed: Oct. 14, 2006

(65) Prior Publication Data
US 2008/0100567 A1 May 1, 2008

(51) Int. Cl.
*A47F 5/00* (2006.01)
(52) U.S. Cl. .................. 248/429; 248/918; 248/919; 361/679.21
(58) Field of Classification Search .......... 248/298.1, 248/602, 424, 429, 917, 919, 920; 361/679.21
See application file for complete search history.

(56) References Cited

U.S. PATENT DOCUMENTS

| | | | | |
|---|---|---|---|---|
| 6,115,449 A * | 9/2000 | Jang et al. | | 378/41 |
| 6,168,250 B1 * | 1/2001 | Rogov | | 312/294 |
| 6,827,409 B2 * | 12/2004 | Michael | | 312/223.3 |
| 7,044,423 B2 * | 5/2006 | Bober et al. | | 248/188.4 |
| 7,184,266 B1 * | 2/2007 | Chen et al. | | 361/679.21 |
| 2004/0221775 A1 * | 11/2004 | Okninski | | 108/147 |
| 2005/0057499 A1 * | 3/2005 | Lee | | 345/158 |

* cited by examiner

*Primary Examiner*—T. McKinnon
*Assistant Examiner*—Steven M Marsh
(74) *Attorney, Agent, or Firm*—Banger Shia

(57) ABSTRACT

A display with a linear driving device comprises a base, a driving device, and a display. In assembly, the driving device is mounted on the base, and then the display is fixed on a mover of the linear motor of the driving device. The user can use remote control or manual touch control to set a predetermined distance that he wants the display to move, once the display receives signal, it will instantly instruct the linear motor of the driving device to move linearly, so that the display will be moved to a predetermined position.

1 Claim, 5 Drawing Sheets

DISPLAY WITH A LINEAR DRIVING DEVICE

BACKGROUND OF THE INVENTION

1. Field of the Invention

The present invention relates to a display, and more particularly to a display with a linear driving device.

2. Description of the Prior Art

The use of display (such as computer screen, LCD, LCD TV, etc) has been found in various industrial fields, consumers are using various displays every day. Obviously, display brings much convenience to most of the people and is indispensable to people's daily life. However, conventional display still has some disadvantages after a long time use, because the conventional screen or display is immovably fixed to the base, that's called integral type display. If the user wants to linearly adjust the position of the screen or the display, for example, moving the display or the screen fifty centimeters to the side audience, he has to move it by hand. Each adjustment must be moved by hand, this is really inconvenient.

The present invention has arisen to mitigate and/or obviate the afore-described disadvantages of the conventional display.

SUMMARY OF THE INVENTION

The primary objective of the present invention is to provide a display with a linear driving device, in the structure of this invention, the linear motor of the driving device is directly used on the display, so that the user can use wireless control method or manual touch control to linearly move the display or the screen. Therefore, the control of the linear movement of the display is quick and easy.

The secondary objective of the present invention is to provide a display with a linear driving device, since the display additionally has a function of controlling the linear movement of the display or the screen by wireless control or manual touch control, thus improving the product's additional value.

A display with a linear driving device in accordance with the present invention comprises:

a base;

a driving device mounted on the base, including a linear motor, the linear motor can enable a mover to linearly move a predetermined distance along a stator; and a display fixed on the mover of the linear motor of the driving device;

wherein the user can use remote control or manual touch control to set a predetermined distance that he wants the display to move, once the display receives signal, it will instantly instruct the linear motor of the driving device to perform a linear movement, so that the display will be moved to a predetermined position.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Referring to FIGS. 1-5, a display with a linearly driving device in accordance with a preferred embodiment of the present invention is shown and comprises: a base 1, a driving device 2, and a display 3.

The base 1 is the same as a base of a conventional base and is provided for positioning the display, in the base 1 of this embodiment is particularly formed a groove 11.

Figure 3:
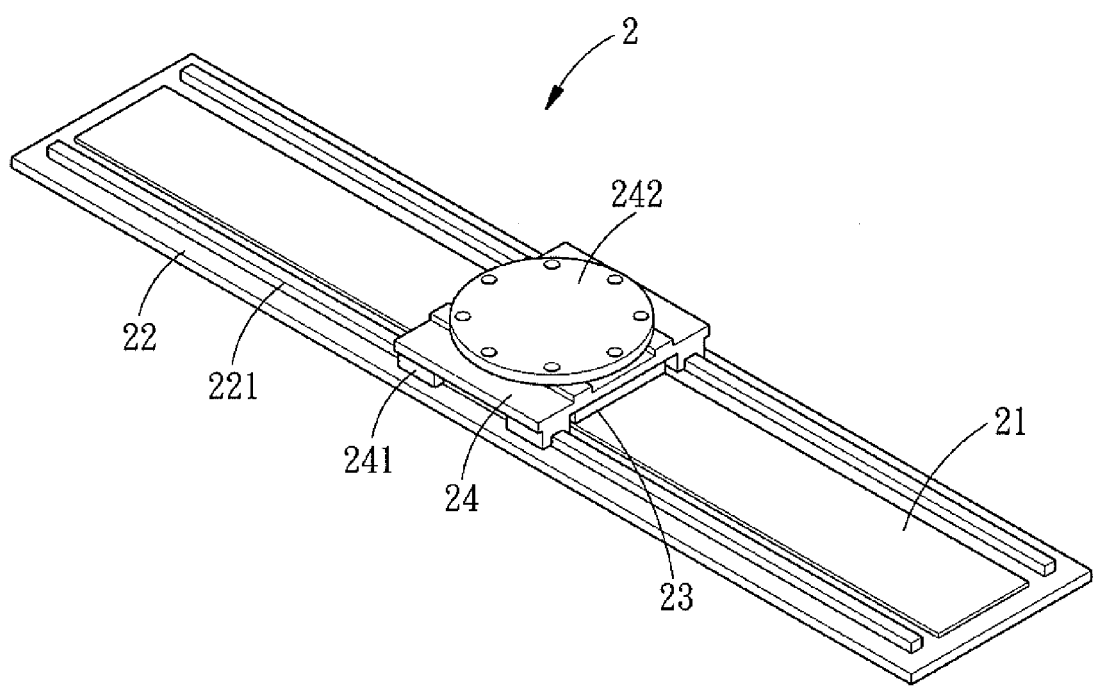
FIG. 3 is a perspective view of the driving device in accordance with the present invention.

The driving device 2 is disposed in the groove 11 of the base 1 and includes a linear motor, as shown in FIG. 3, the stator 21 of the linear motor of the driving device 2 is fixed on a chassis 22 having a slideway 221. The mover 23 of the linear motor is fixed on a movable seat 24 having a sliding block 241 and a connecting seat 242. The sliding block 241 enables the moveable seat 24 to straddle the slideway 221 of the stator 21. The linear motor cooperates with the change of the current to make the stator 21 produce a linear magnetic field, thus enabling the mover 23 to move linearly.

Figure 1:
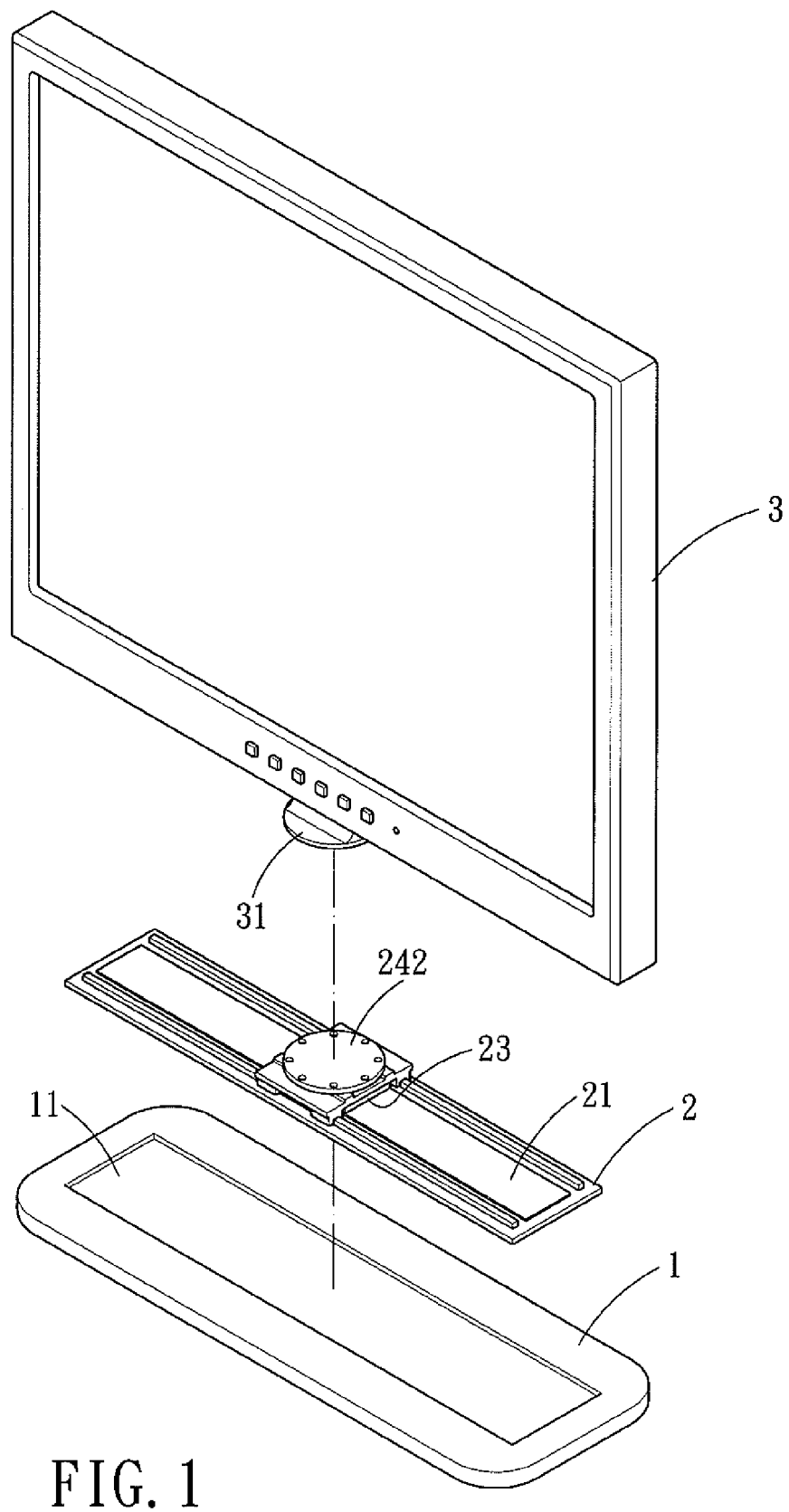
FIG. 1 is an exploded view of a display with a linear driving device in accordance with the present invention.
Figure 2:
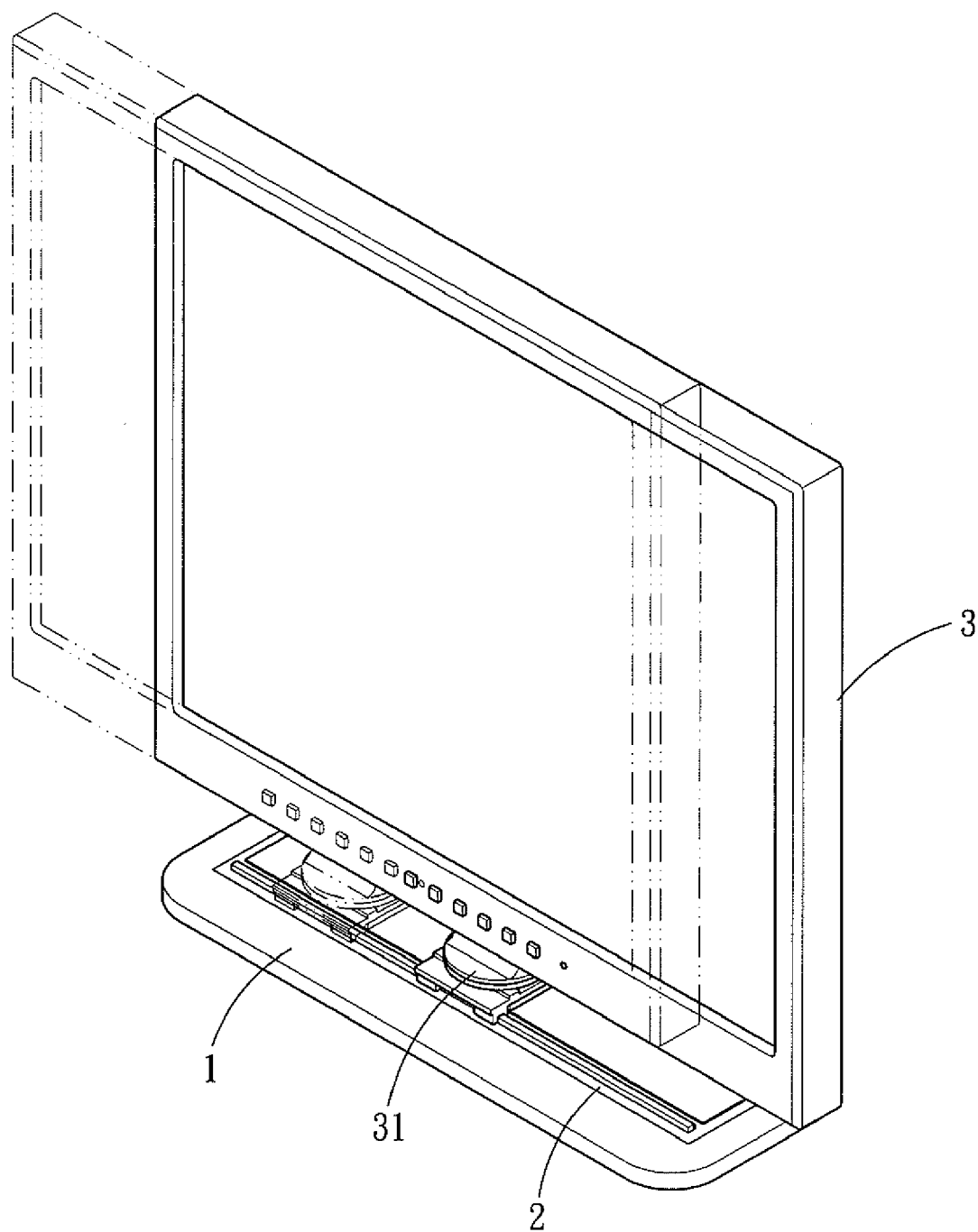
FIG. 2 is an illustrative view in accordance with the present invention of showing the status of the display before and after movement.
Figure 4:
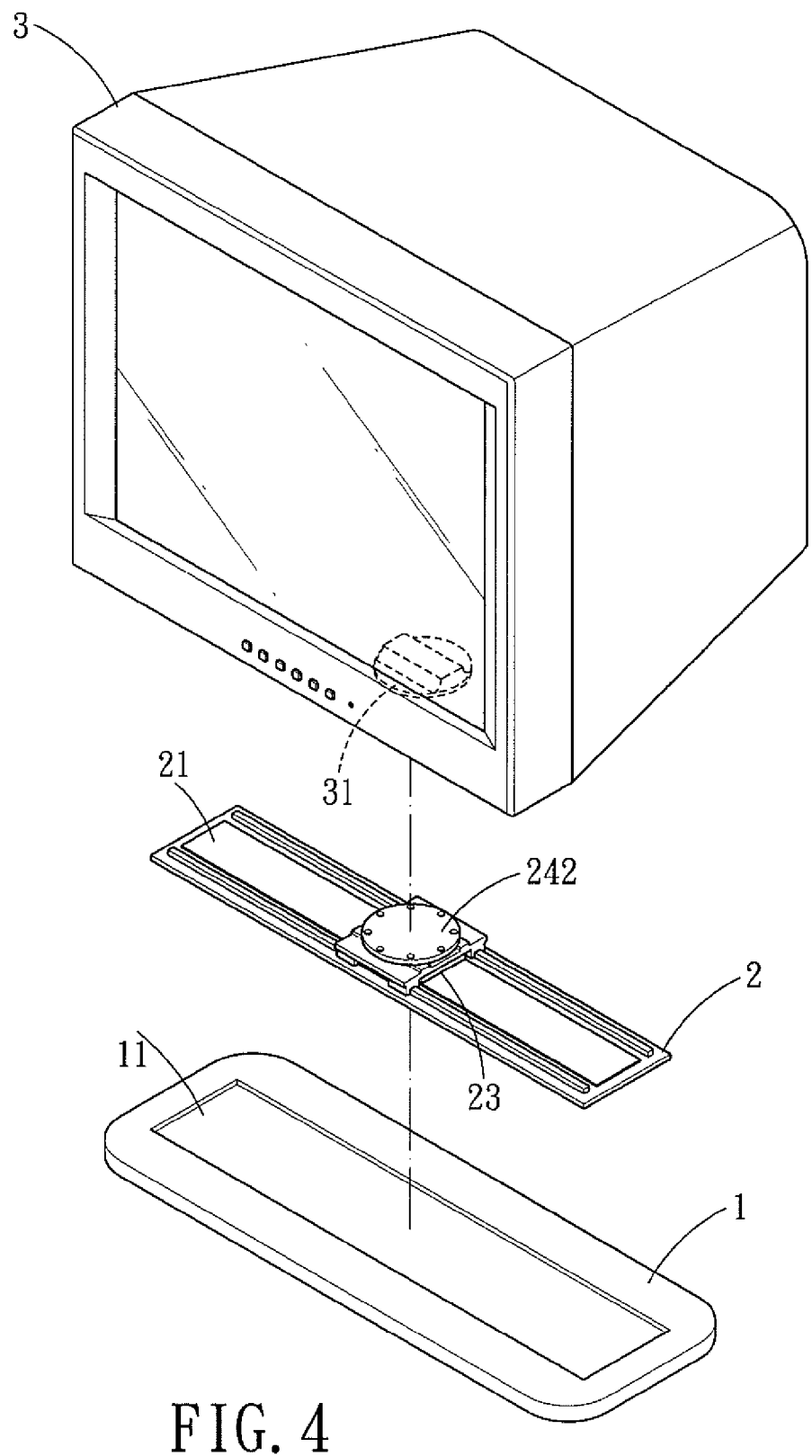
FIG. 4 is an exploded view in accordance with the present invention of showing that the display with a linear driving device is used on a computer display.
Figure 5:
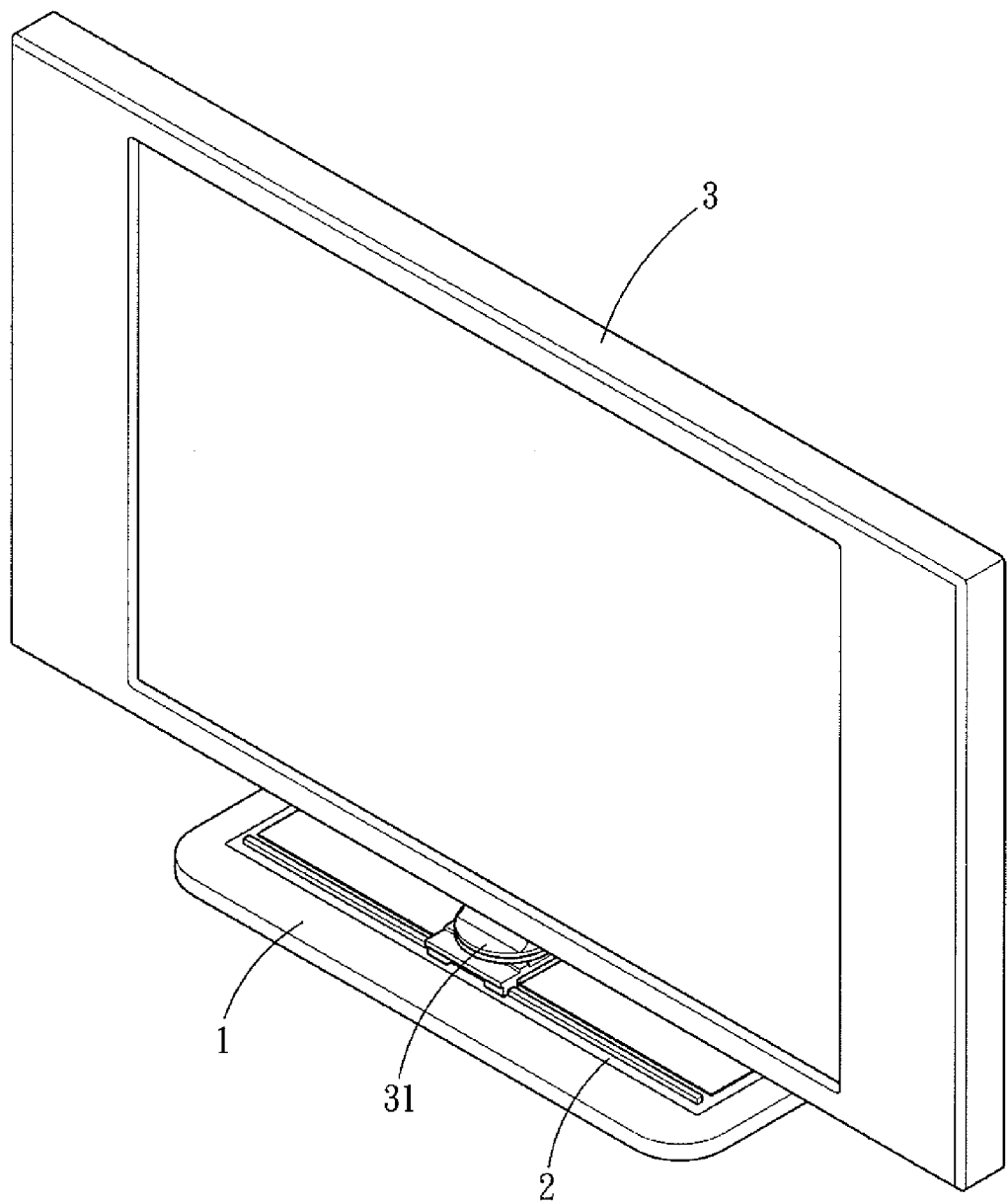
FIG. 5 is an assembly view in accordance with the present invention of showing that the display with a linear driving device is used on a computer display.

The display 3 can be a computer display (as shown in FIG. 4), a LCD display (as shown in FIG. 2), a LCD TV (as shown in FIG. 5), and etc. For easy assembly, a connecting board 31 can be formed at the bottom of the display 3, so as to fix the display 3 to the connecting seat 242 of the moveable seat 24. By such arrangements, the driving device 2 can be stably assembled to the display 3.

For a better understanding of the embodiment, its operation and function, reference should be made to the respective figures again. When the user wants to move the display 3 linearly to a predetermined position, he can use a remote control (not shown) or the display to set a predetermined distance that he wants the display 3 to move, by using wireless control or manual control. Once the display 3 receives the signal, it will instantly instruct the linear motor of the driving device 2 to move, thus making the mover 23 move the predetermined distance. At this moment, the display 3 assembled to the mover 23, the moveable seat 24 and the connecting seat 242 will be synchronously moved to the predetermined position. Therefore, the control of the linear movement of the display 3 is quick and easy.

To summarize, in the structure of this invention, the linear motor of the driving device is directly used on the display, so that the user can use wireless control method or manual touch control to linearly move the display or the screen. Therefore, the control of the linear movement of the display is quick and easy.

While we have shown and described various embodiments in accordance with the present invention, it is clear to those skilled in the art that further embodiments may be made without departing from the scope of the present invention.

What is claimed is:

1. A display with a linear driving device, comprising:

a base;

a driving device mounted on the base, including a linear motor, the linear motor enables a mover to linearly move in a predetermined distance along a stator; and a display fixed on the mover of the linear motor of the driving device;

wherein a user uses a remote control or a manual touch control to set a predetermined distance that the user prefers for the display to move about, once the display receives a signal, it instantly instructs the linear motor of the driving device to perform a linear movement for the display to move to a predetermined location wherein the mover of the linear motor is fixed on a movable seat having a sliding block and a connecting seat, the sliding block enables the moveable seat to straddle a slideway of the stator, a connecting board is formed at a bottom of the display thereof for fixing the display to the connecting seat of the moveable seat.

* * * * *